United States Patent
Nath et al.

(10) Patent No.: US 10,703,363 B2
(45) Date of Patent: Jul. 7, 2020

(54) IN-VEHICLE TRAFFIC ASSIST

(71) Applicant: Ford Global Technologies, LLC, Dearborn, MI (US)

(72) Inventors: Nitendra Nath, Troy, MI (US); Aaron L. Mills, Ann Arbor, MI (US); Patrick Lawrence Jackson Van Hoecke, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 326 days.

(21) Appl. No.: 15/783,900

(22) Filed: Oct. 13, 2017

(65) Prior Publication Data

US 2019/0111922 A1   Apr. 18, 2019

(51) Int. Cl.
| | | |
|---|---|---|
| *B60W 30/12* | (2020.01) | |
| *G06K 9/46* | (2006.01) | |
| *G05D 1/00* | (2006.01) | |
| *G05D 1/02* | (2020.01) | |
| *G06K 9/00* | (2006.01) | |
| *G08G 1/16* | (2006.01) | |

(52) U.S. Cl.
CPC ........... *B60W 30/12* (2013.01); *G05D 1/0088* (2013.01); *G05D 1/0246* (2013.01); *G06K 9/00798* (2013.01); *G06K 9/4633* (2013.01); *G08G 1/167* (2013.01); *G05D 2201/0213* (2013.01); *G06T 2207/30256* (2013.01)

(58) Field of Classification Search
None
See application file for complete search history.

(56) References Cited

U.S. PATENT DOCUMENTS

| | | | |
|---|---|---|---|
| 8,180,525 B2 | 5/2012 | Luke et al. | |
| 9,308,914 B1 | 4/2016 | Sun et al. | |
| 2007/0100551 A1* | 5/2007 | Ishikura | B60T 8/17551 701/301 |
| 2009/0080704 A1* | 3/2009 | Mori | G06K 9/00798 382/104 |
| 2010/0082195 A1* | 4/2010 | Lee | B62D 15/025 701/25 |
| 2014/0267415 A1* | 9/2014 | Tang | G06T 11/60 345/633 |
| 2015/0151725 A1* | 6/2015 | Clarke | B60W 30/00 701/28 |
| 2015/0354976 A1* | 12/2015 | Ferencz | G01C 21/3602 382/104 |
| 2017/0008521 A1* | 1/2017 | Braunstein | G01C 21/32 |
| 2019/0049972 A1* | 2/2019 | Prasad | G05D 1/0212 |

FOREIGN PATENT DOCUMENTS

| | | |
|---|---|---|
| CN | 106218636 A | 12/2016 |
| DE | 102011085167 A1 | 4/2013 |
| DE | 102015207025 A1 | 10/2016 |
| EP | 2322400 A2 | 5/2011 |

* cited by examiner

*Primary Examiner* — Navid Ziaeianmehdizadeh
(74) *Attorney, Agent, or Firm* — Frank A. MacKenzie; Bejin Bieneman PLC (57) ABSTRACT

A system, comprising a processor and a memory, the memory including instructions to be executed by the processor to pilot a vehicle based on determining first and second lane markers, where lane markers are mathematical descriptions of roadway lane markers applied to a roadway to mark traffic lanes, determine a missing first or second lane marker, and pilot the vehicle for a determined period of time based on a remaining first or second lane marker.

20 Claims, 8 Drawing Sheets

IN-VEHICLE TRAFFIC ASSIST

BACKGROUND

Vehicles can be equipped to operate in both autonomous and occupant piloted mode. Vehicles can be equipped with computing devices, networks, sensors and controllers to acquire information regarding the vehicle's environment and to pilot the vehicle based on the information. Safe and comfortable piloting of the vehicle can depend upon acquiring accurate and timely information regarding the vehicles' environment. Computing devices, networks, sensors and controllers can be equipped to analyze their performance, detect when information is not being acquired in an accurate and timely fashion, and take corrective actions including informing an occupant of the vehicle, relinquishing autonomous control or parking the vehicle.

DETAILED DESCRIPTION

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

Disclosed herein is a method, comprising piloting a vehicle based on determining first and second lane markers, where lane markers are mathematical descriptions of roadway lane markers applied to a roadway to mark traffic lanes. Determining a missing first or second lane marker and piloting the vehicle for a determined period of time can be based on a remaining first or second lane marker and determining a steerable path polynomial confidence, where steerable path polynomial confidence is a probability that the vehicle will accurately follow a path, wherein the lane marker is missing because of a roadway entrance or exit ramp. Determining the first and second lane markers can include processing one or more acquired images with Hough transforms to determine lane marker confidence.

Steerable path polynomial confidence can be based on determining lane marker confidence, determining a position of the vehicle with respect to a steerable path polynomial, determining a steerable path polynomial curvature, and determining inertial navigation data. Determining steerable path polynomial confidence can be based on determining the position of the vehicle with respect to the steerable path polynomial, determining inertial navigation data, and determining steerable path polynomial curvature. The position of the vehicle is determined based on inertial navigation data. Determining steerable path polynomial curvature is based on the remaining first or second lane marker, the position of the vehicle and inertial navigation data. The period of time can be based on the steerable path polynomial curvature and the lane marker confidence.

Determining the period of time can be based on the steerable path polynomial and vehicle speed or a predetermined time. The vehicle speed can be based on inertial navigation data. The period of time can be based on lateral acceleration a limits applied to the steerable path polynomial. Lane marker confidence can be determined by comparing Hough transform results with input video data. Lane marker confidence can be determined by comparing the location of the lane marker with the location of the steerable path polynomial to determine if the lane marker is parallel and at an expected distance from the steerable path polynomial. If the lane marker is not parallel and at an expected distance from the steerable path polynomial, lane marker confidence can be low.

Further disclosed is a computer readable medium, storing program instructions for executing some or all of the above method steps. Further disclosed is a computer programmed for executing some or all of the above method steps, including a computer apparatus, programmed to pilot a vehicle based on determining first and second lane markers, where lane markers are mathematical descriptions of roadway lane markers applied to a roadway to mark traffic lanes. The computer can be further programmed to determine a missing first or second lane marker and piloting the vehicle for a determined period of time can be based on a remaining first or second lane marker and determining a steerable path polynomial confidence, where steerable path polynomial confidence is a probability that the vehicle will accurately follow a path, wherein the lane marker is missing because of a roadway entrance or exit ramp. The computer can be further programmed to determine the first and second lane markers can including processing one or more acquired images with Hough transforms to determine lane marker confidence.

Steerable path polynomial confidence can be based on determining lane marker confidence, determining a position of the vehicle with respect to a steerable path polynomial, determining a steerable path polynomial curvature, and determining inertial navigation data. Determining steerable path polynomial confidence can be based on determining the position of the vehicle with respect to the steerable path polynomial, determining inertial navigation data, and determining steerable path polynomial curvature. The position of the vehicle is determined based on inertial navigation data. Determining steerable path polynomial curvature is based on the remaining first or second lane marker, the position of the vehicle and inertial navigation data. The period of time can be based on the steerable path polynomial curvature and the lane marker confidence.

The computer can be further programmed to determine the period of time can be based on the steerable path polynomial and vehicle speed or a predetermined time. The vehicle speed can be based on inertial navigation data. The period of time can be based on lateral acceleration a limits applied to the steerable path polynomial. Lane marker confidence can be determined by comparing Hough transform results with input video data. Lane marker confidence can be determined by comparing the location of the lane marker with the location of the steerable path polynomial to determine if the lane marker is parallel and at an expected distance from the steerable path polynomial. If the lane marker is not parallel and at an expected distance from the steerable path polynomial, lane marker confidence can be low.

Figure 1:
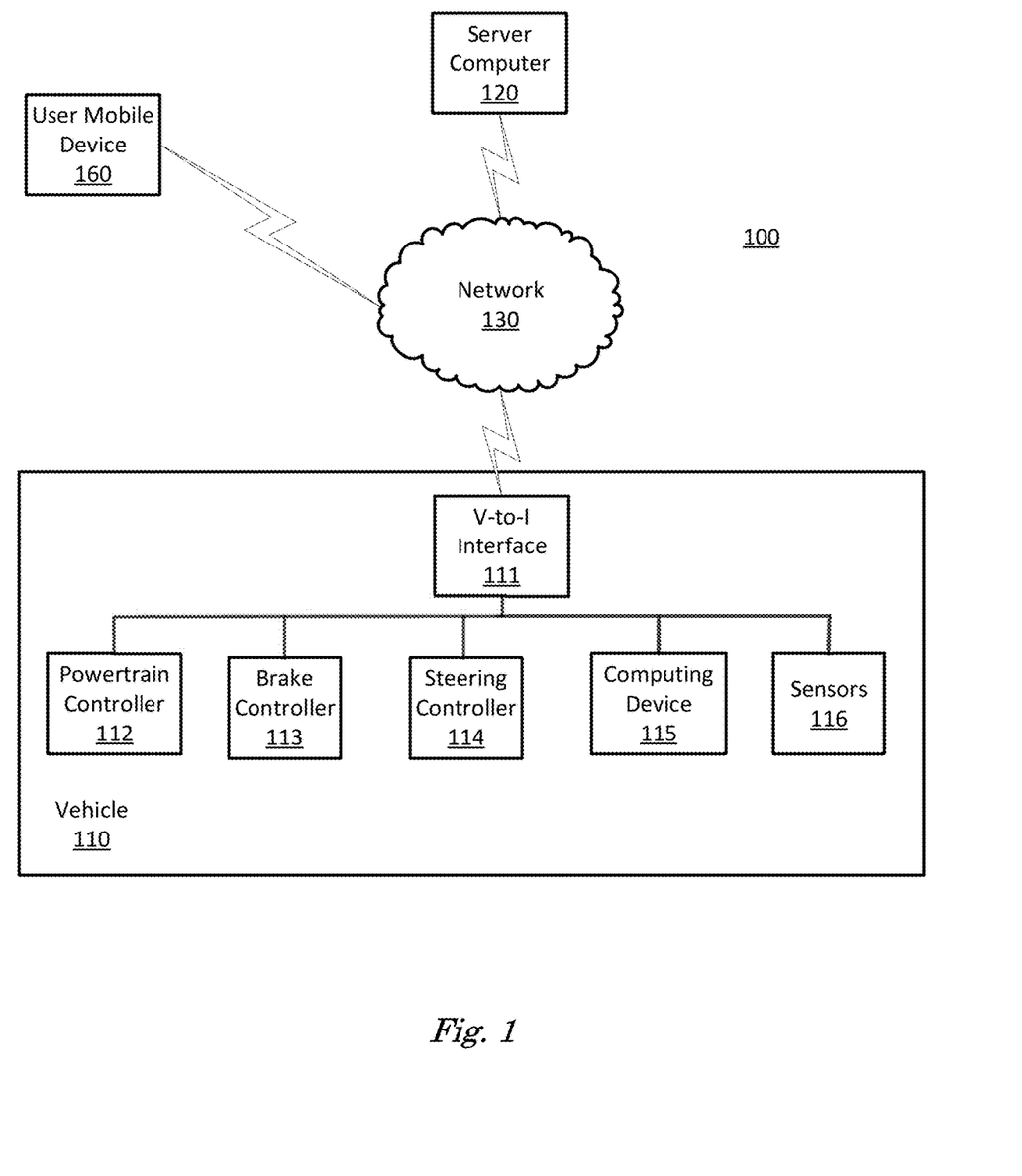
FIG. 1 is a block diagram of an example vehicle.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
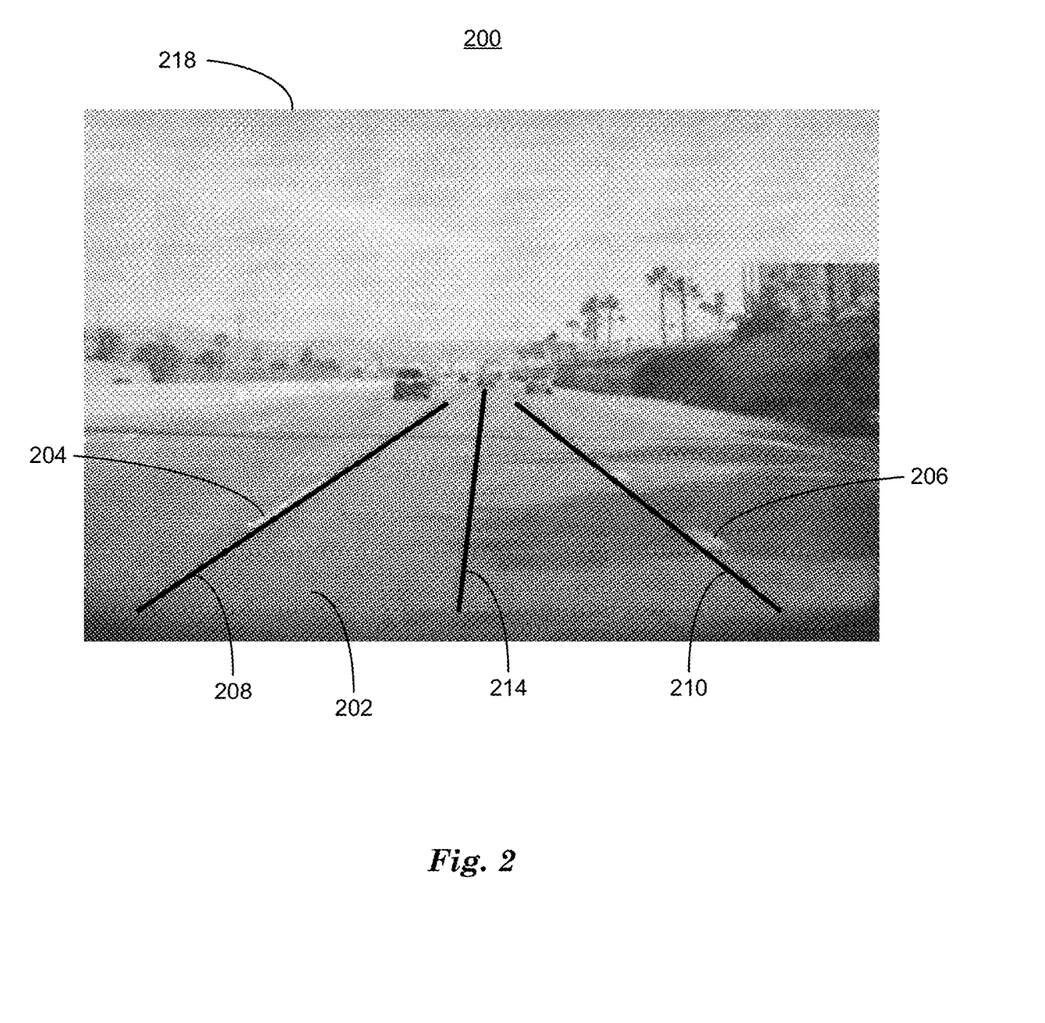
FIG. 2 is a diagram of an example traffic scene image with lane markers.

FIG. 2 is a diagram of a video image 218 of a traffic scene 200 with a roadway 202 upon which a vehicle 110 is being piloted. Computing device 115 can be configured to receive image data from a video camera 202 as one of the sensors 116. The image data can include images such as traffic scene image 200, for example. Video image 218 includes visual depictions of roadway lane markers 204, 206. Roadway lane markers 204, 206 are paint, pigment or synthetic laminate applied to roadways as geometric shapes such a solid or dashed lines and arrows, for example, in contrasting colors, including white and yellow, for example, to mark traffic lanes. Occupants piloting a vehicle 110 can see roadway lane markers and thereby direct a vehicle 110 safely and efficiently to reach a destination using the roadway by following traffic lanes. A video camera sensor 116 in vehicle 110 can acquire a video image 218 of traffic scene 200 including visual depictions of roadway markers 204, 206. Computing device 115 can use machine vision techniques to determine lane markers 208, 210 associated with the roadway lane markers 204, 206 in video image 218 of traffic scene 200. A lane marker 208, 210 is a mathematical description of the geometric shape represented by visual depictions of roadway lane markers 204, 206. Computing device 115 can combine determined lane markers 208, 210 with steerable path parameters including a steerable path polynomial 214 to form a lane model that mathematically describes a traffic lane on a roadway 202 that vehicle 110 can be piloted upon safely and accurately to reach a predetermined destination.

Steerable path parameters can include a steerable path polynomial 214, which is a polynomial function of degree n, where n is between 3 and 5, inclusive, for example, that describes the predicted motion of vehicle 110 in a plane parallel to the roadway starting from a location on a vehicle 110 and extending in a direction equal to the current direction of vehicle 110 and including lateral and longitudinal accelerations applied to vehicle 110 by brakes, steering and powertrain. Lane model can also include lane markers 208, 210, where roadway markers 204, 206 are represented mathematically as polynomial functions of degree m, where m is between 1 and 2, inclusive, that represent a best-fit polynomial function to roadway lane marker 208, 210 data in video image 218.

For example, since roadway lane markers 208, 210 can include a limited number of geometric shapes such as lines, arrows, letters, numbers and glyphs, in a limited number of sizes, a Hough transform can identify these geometric shapes in video image 218 data by first thresholding the pixel data, where thresholding includes comparing pixel data of video image 218 to a predetermined value to determine a "1" or "0" value output and then projecting the video image 218 data onto plane parallel with roadway 202. Thresholded and projected video image 218 data can be processed by a limited number of Hough transforms, which map thresholded, projected video image 218 data into parametric geometry spaces, permitting computing device 115 to identify and locate a geometric shape in a video image 218 by determining a cluster of similar parameter values in multi-dimensional parameter spaces by maximum likelihood estimation, for example. Maximum likelihood estimation is a statistical processing technique that identifies geometric shapes as clusters of similar points in a multi-dimensional space by statistical measures applied to the points. The identified geometric shapes can be inverse-transformed back into image space from multi-dimensional parameter space and root-mean-square differences from the input projected and thresholded video image 218 data calculated to produce goodness of fit measures.

A lane model can include a steerable path polynomial 214, and lane markers 208, 210 which can permit computing device 115 to pilot vehicle 110 safely to a predetermined destination. Computing device 115 can associate a confidence level with a lane model, based on confidence levels associated with lane markers 208, 210 and lane cues 216. A confidence level can be rated as high, meaning that a high probability exists that a lane marker 208, 210 is accurately represents a roadway lane marker 204, 206 or low, meaning that a low probability exists that a lane marker 208, 210 accurately represents a roadway lane marker 204, 206. Confidence levels and also be at intermediate levels, and be rated as low/moderate and high/moderate. Examples of goodness of fit values for lane markers 208, 210 can be experimentally produced to determine the relationship between goodness of fit values and confidence levels. This predetermined relationship between goodness of fit values and confidence levels can be applied to goodness of fit values determined for Hough transform results to determine confidence levels for the Hough transform results, including lane markers 208, 210, for example.

Lane marker 208, 210 confidence levels can be determined based on confidence levels associated with the Hough transform results and expected position with respect to steerable path polynomial 214, for example. Confidence levels for on lane markers 208, 210 determined in this fashion can be combined with steerable path polynomial 214 curvature and vehicle 110 location with respect to steerable path polynomial 214 discussed below in relation to FIGS. 3-5 to form an overall confidence level for a lane model.

Figure 3:
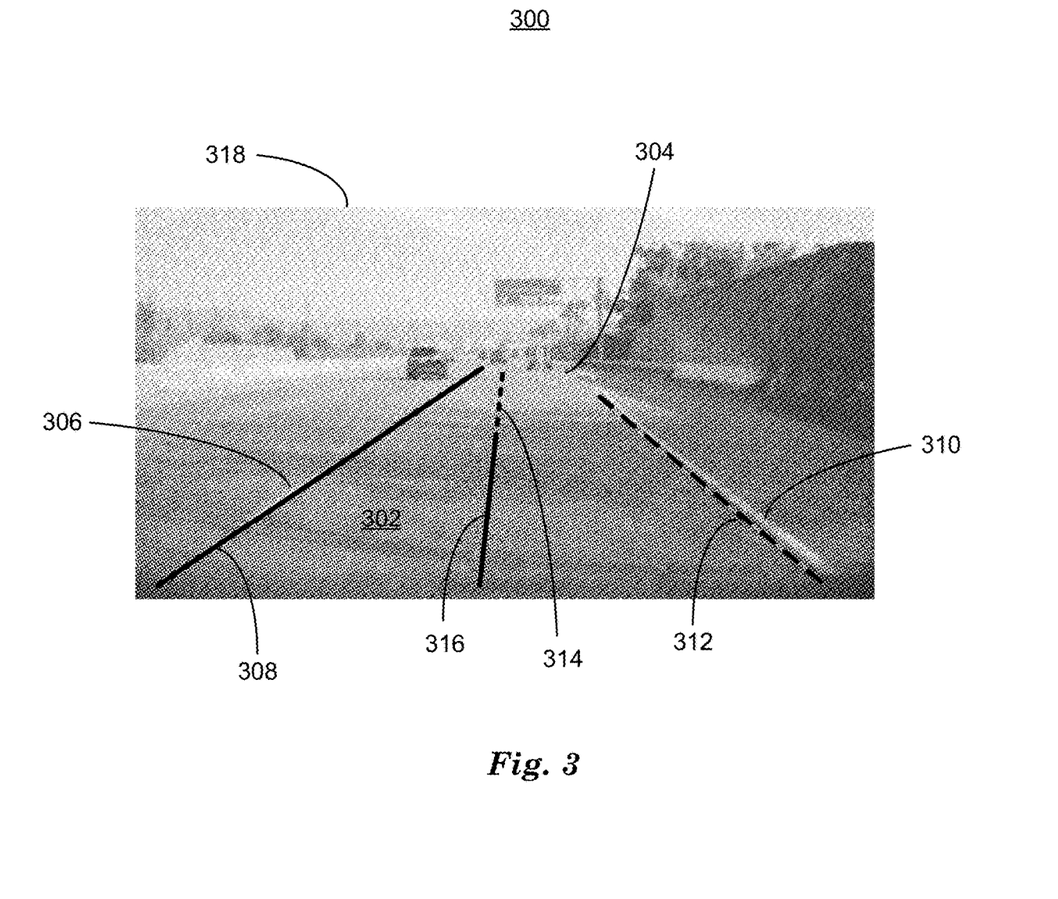
FIG. 3 is a diagram of an examples traffic scene image with lane markers.

FIG. 3 is a diagram of a traffic scene image 300. Traffic scene image 300 includes an image of a roadway 302 with a highway exit ramp 304, a common occurrence on a roadway 302. Highway exit and entrance ramps can cause computing device 115 to determine that a confidence level for a lane model, which can be based on confidence levels of two or more lane markers 306, 312 is not sufficient to determine a steerable path polynomial 316 with high or moderate confidence for safely piloting a vehicle 110. In traffic scene image 300, a lane marker 308, corresponding to roadway lane marker 306, is determined by computing device 115 with high confidence level, since Hough transform results are in good agreement with video image 318 data, thereby providing high or good confidence and lane marker 308 is positioned correctly with respect to steerable path polynomial 316. Lane marker 312 (dotted line), corresponding to roadway lane marker 310, has a low confidence level. Although Hough transform results are in good agreement with visual representation of roadway lane marker 310 in video image 318 data, lane marker 312 is not correctly positioned with respect to steerable path polynomial 316, since lane marker is not parallel with steerable path polynomial 316 at the expected distance for a portion of the length of steerable path polynomial 316. Since lane marker 312 is not correctly positioned with respect to steerable path polynomial 316, a low confidence level is associated with lane marker 312, and lane marker 312 can be determined to be missing from the lane model.

In the example in FIG. 3, computing device 115 is piloting a vehicle with a lane model based on two or more lane markers 308, 312 with high confidence, and, as a result of changes in video image 318 of roadway 302 caused by motion of vehicle 110, lane marker 312 is determined to be missing. This can cause computing device 115 to stop calculating new steerable path polynomials 316 and thereby place a limit, in time and distance traveled, on piloting vehicle 110. In examples where an occupant is prepared to assist in piloting vehicle 110, computing device 115 can turn control of vehicle 110 over to an occupant prior to vehicle 110 reaching the end of the calculated steerable path polynomial 316, since computing device 115 cannot pilot vehicle 110 safely to a predetermined destination without a steerable path polynomial 316 to pilot vehicle 110 upon. Computing device 115 can indicate that control is being turned over to the occupant by alerting the occupant with a sound, like a chime, or recorded or synthesized voice, visual alerts, haptic alerts, etc.

In the example traffic scene 300 shown in FIG. 3, since the missing lane marker 312 is related to an exit ramp 304, there can be a high probability that missing lane marker 312 will be restored shortly as vehicle 110 travels past the exit ramp 304 and thereby acquires video image 318 data that includes two high confidence lane markers 308, 312. Computing device 115, can anticipate the resumption of high confidence lane markers 308, 312 by adding an extension 314 to a steerable path polynomial 316 under certain conditions to permit computing device 115 to pilot vehicle 110 despite missing a lane marker 312 for a short period of time while passing exit ramp 304, for example. Conditions for adding extension 314 to steerable path polynomial 316 include having at least one high confidence lane marker 308, vehicle 110 being positioned on or near the steerable path polynomial 316, and having a relatively straight (non-curved) steerable path polynomial 316. These conditions are discussed in relation to FIGS. 4 and 5, below.

Figure 4:
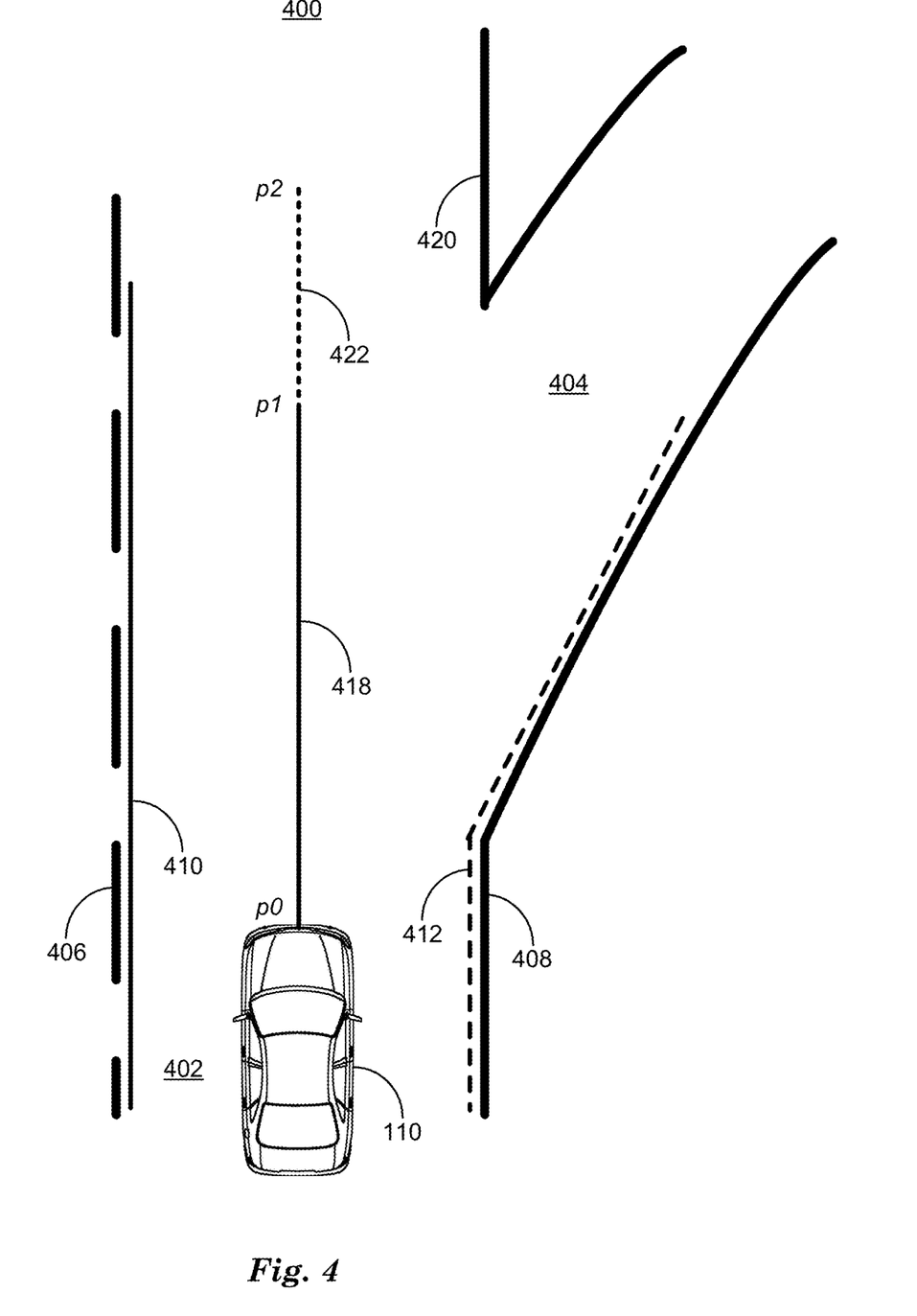
FIG. 4 is a diagram of an example traffic scene with lane markers.

FIG. 4 is a diagram of a traffic scene 400 in which a computing device 115, in a vehicle 110 on a roadway 402 with an exit ramp 404 having visual representations of lane markers 406, 408, has determined a lane marker 410 with high confidence and a lane marker 412 with low or no confidence based on roadway lane markers 406, 408 respectively. Roadway lane marker 420 is not visible to the sensors 116 of vehicle 110 when vehicle 110 is at point p0 in traffic scene 400. To avoid turning control over to an occupant, computing device 115 can determine, based on having at least one lane marker 410 with high or moderate confidence, curvature of the steerable path polynomial 418 upon which the vehicle 100 is being piloted, and vehicle 110 location based on inertial navigation data from sensors 116, computing device 115 adds an extension 422 to steerable path polynomial 418 to extend availability of autonomous piloting from point p1 to point p2 on roadway 402 to permit vehicle 110 to be piloted by computing device 115 until roadway lane marker 420 comes into view of sensors 116 before reaching point p2.

When roadway lane marker 420 comes into view of sensors 116 as a result of vehicle 110 being piloted along steerable path polynomial 418, computing device 115 can determine a new lane marker associated with roadway lane marker 420 with high confidence, and thereby determine a lane model with high or moderate confidence, thereby permitting computing device 115 to continue to pilot vehicle 110 safely to a predetermined destination without interruption in spite of passing exit ramp 404 and, for a period of time, missing one of the two or more high or moderate confidence lane markers 410, 412 required for a high or moderate confidence lane model. Adding an extension 422 to steerable path polynomial 418 permits computing device 115 to pilot vehicle 110 past the missing lane marker 412 without turning vehicle 110 control over to, or alerting, the occupant.

The extension 422 applied to a steerable path polynomial can be determined by computing device 115 as either a period of time or a distance. For example, in traffic scene 400, vehicle 110 will follow steerable path polynomial 418, traveling the distance d1 between points p0 and p1 at a speed s in a time t0. Extension 422 extends the steerable path polynomial 418 a distance d2 from point p1 to point p2 along extension 422. Vehicle 110 will travel distance d2 between points p1 and p2 in a time t1. Extension 422 can be determined by computing device 115 as either distance d2 or time t1 and converted in either case to the other based on determining the speed of vehicle 110 with inertial navigation data from sensors 116, for example.

Figure 5:
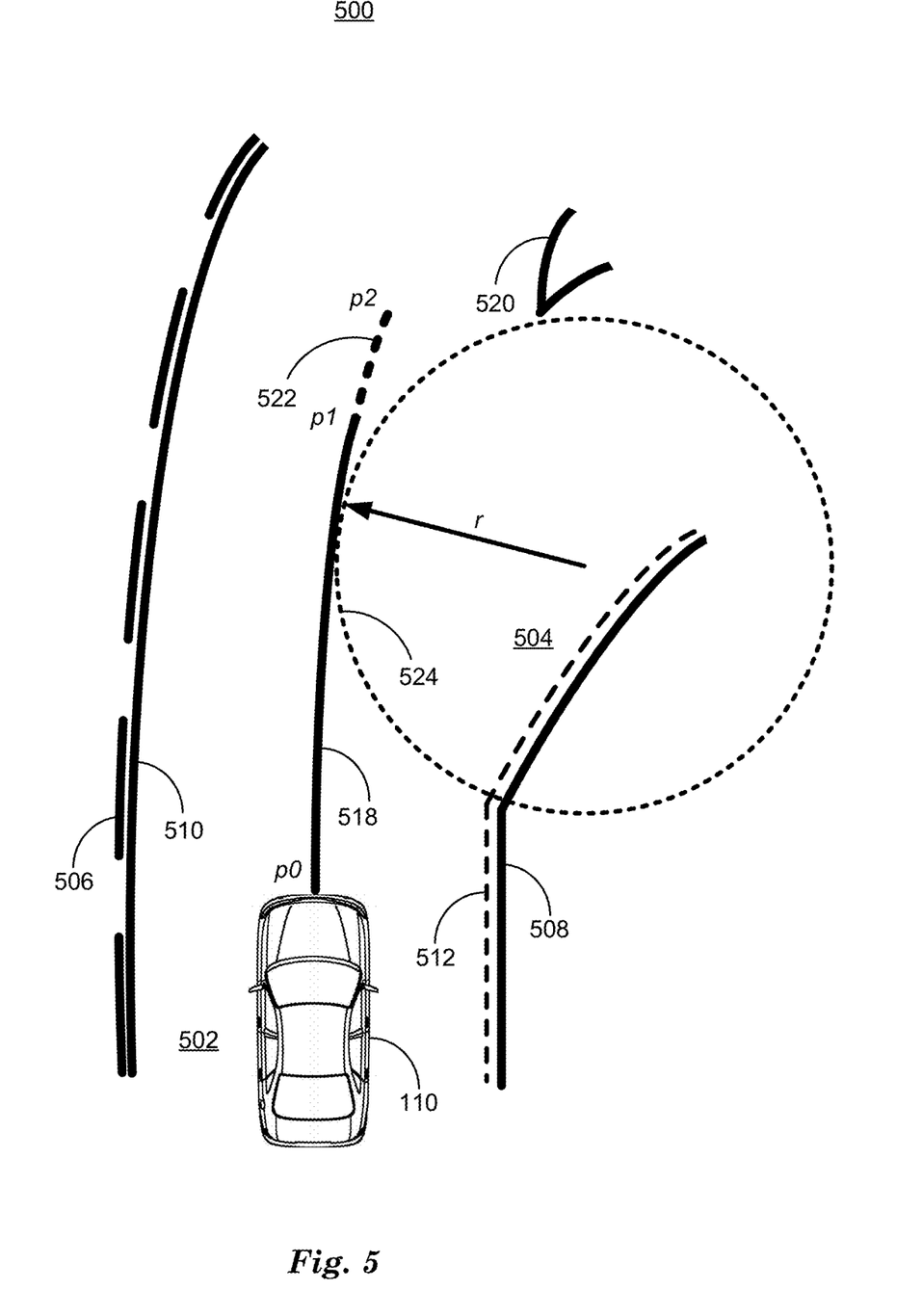
FIG. 5 is a diagram of an example traffic scene with lane markers.

FIG. 5 is a diagram of a traffic scene 500 in which a computing device 115 in a vehicle 110 on a roadway 502 with an exit ramp 504 has determined a lane model including a steerable path polynomial 518 based on lane markers 510, 512 in turn determined based on roadway lane markers 506, 508 where lane marker 510 is associated with a lane model with high confidence, and lane marker 512 (dashed line) a is associated with roadway lane marker 508 with low confidence, since lane marker 512 is not positioned parallel to, and spaced correctly from, steerable path polynomial 518. In this case, steerable path polynomial 518 has non-zero radius of curvature r, since predicted lateral acceleration for steerable path polynomial 518 are non-zero.

Steerable path polynomial 518 can include non-zero lateral acceleration. For example, piloting vehicle 110 from point p0 to point p2 along steerable path polynomial 518 can include non-zero lateral acceleration during the time period from p0 to p1 and from p1 to p2, where steerable path polynomial 318 has a constant right lateral acceleration equal to a, the centripetal force generated on a mass equal to vehicle 110 by a circle 524 with radius r tangent to steerable path polynomial 518. The lateral acceleration a and vehicle 110 speed combine with longitudinal acceleration to determine the location, speed and direction of vehicle 110 on roadway 502. Lateral acceleration a can have constraints determined by occupant comfort in addition to traction constraints that avoid skids and consequent loss of control of vehicle 110. High lateral acceleration a can be uncomfortable to occupants and computing device 115 can be programmed to avoid high lateral acceleration a except in emergencies, where avoiding collision can depend upon high lateral or longitudinal acceleration or deceleration, for example.

Lateral acceleration is based on the radius of curvature r and the speed, both of which can be determined by computing device 115 with data from sensors 116, including inertial navigation data. Inertial navigation data can be based on accelerometer data, which measures the acceleration of vehicle 110 in three dimensions with a high degree of sensitivity and accuracy. Integrating acceleration with respect to time yields velocity and integrating again with respect to time yields displacement in three dimensions. Tracking acceleration in three dimensions permits computing device 115 to determine the radius of curvature r of steerable path polynomial 518 associated with the lane model and to determine the location of vehicle 110 with respect to the steerable path polynomial 518 and roadway 502.

Computing device 115 can determine a high confidence value for lane marker 510, based on machine vision techniques discussed in relation to FIG. 2, above, and the location of lane marker 510 with respect to steerable path polynomial 518 that determine lane marker 510, based on roadway lane marker 506, reporting a high confidence value. In examples where computing device 115 determines a lane marker 510 with medium or high confidence and determines a missing lane marker 512, computing device 115 can add extension 522 to steerable path polynomial 518 to permit computing device 115 to pilot vehicle 110 until roadway lane marker 520 is visible to vehicle 110 sensors 116, and computing device 115 can determine two high confidence lane markers 510, 512, for example. Computing device 115 can determine that lane marker 512 is missing, based on the machine vision program returning a low confidence value that lane marker 512 is associated with the current lane model as discussed above in relation to FIG. 3.

Computing device 115 can determine the radius of curvature r of the steerable path polynomial 518 and extension 522 associated with the lane model and, based on the speed of the vehicle 110, determine if a predicted lateral acceleration a would be greater than a predetermined value. If the predicted lateral acceleration a would be greater than a predetermined value, the steerable path polynomial 518 would not apply extension 522 to steerable path polynomial 518. The predetermined value can be determined by experimentally testing the accuracy of vehicle 110 travel while laterally accelerating. Since high lateral acceleration a can reduce the confidence that vehicle 110 will travel to a desired point accurately, high lateral acceleration can reduce the confidence that applying extension 522 to steerable path polynomial would permit computing device 115 to safely and accurately pilot vehicle 110 to reach point p2 on roadway 502, for example.

Applying extension 522 the steerable path polynomial 518 can also be based on the position of the vehicle 110 with respect to the steerable path polynomial 518. Vehicle 110 location can vary from being located precisely on steerable path polynomial 518 at a given time due to normal variations in roadway 502 and vehicle 110 as vehicle 110 is being piloted. Piloting vehicle 110 along a path defined by steerable path polynomial 518 can be performed by computing device 115 with closed-loop feedback control theory-based techniques that determine the trajectory of vehicle 110 including the location, direction, speed, lateral acceleration and longitudinal acceleration of vehicle 110 and compare the determined trajectory to the trajectory predicted by steerable path parameters including steerable path polynomial 518.

The trajectory of vehicle 110 can be determined based on inertial navigation data as discussed above. The trajectory including location of vehicle 110 with respect to the steerable path polynomial 518 can determine, among other parameters, a predicted lateral acceleration required to return vehicle 110 to the steerable path polynomial 518. If computing device 115 determines that the lateral acceleration a required to return vehicle 110 to a location on steerable path polynomial 518 is greater than a predetermined value, computing device 155 can alert an occupant and turn control over to the occupant. The predetermined value can be based on experimental results that determine a relationship between lateral acceleration a and occupant comfort, and based on traction limits, beyond which a vehicle 110 can skid and lose control.

Figure 6:
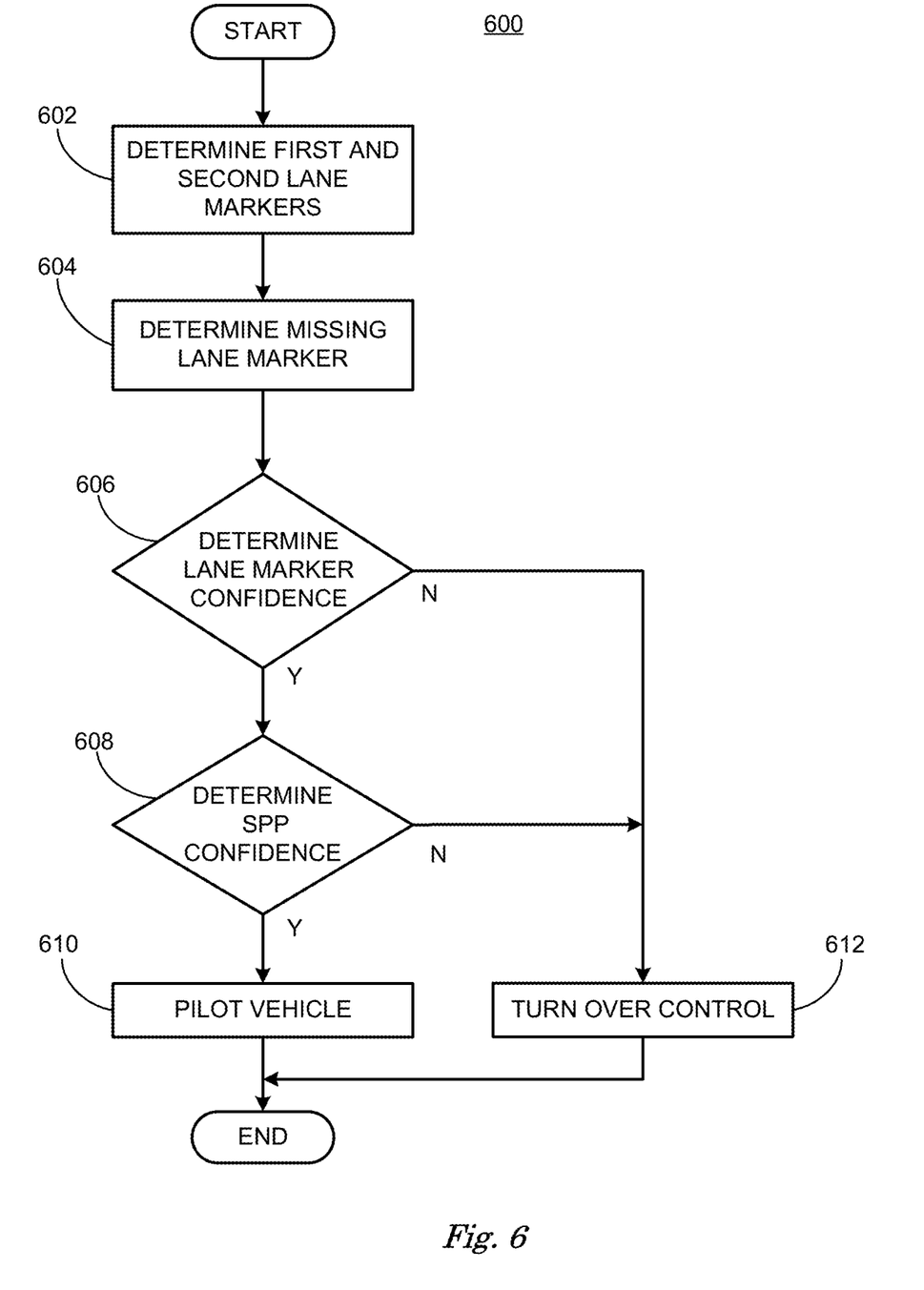
FIG. 6 is a flowchart diagram of an example process to pilot a vehicle.

FIG. 6 is a diagram of a flowchart, described in relation to FIGS. 1-5, of a process 600 for piloting a vehicle based on determining a lane model and steerable path parameter confidence for the lane model. Process 600 can be implemented by a processor of computing device 115, taking as input information from sensors 116, and executing instructions and sending control signals via controllers 112, 113, 114, for example. Process 600 includes multiple steps taken in the disclosed order. Process 600 also includes implementations including fewer steps or can include the steps taken in different orders.

Process 600 begins at step 602, where computing device 115 in vehicle 110 determines first and second lane markers 208, 210 with high confidence and include the lane markers 208, 210, in a lane model, also having steerable path parameters including steerable path polynomial 214, while piloting or assisting piloting vehicle 110.

At step 604, computing device 115 determines that one or more of the lane markers 312 is missing by determining that the confidence associated with the lane model 312 is low. This determination can be made by comparing the confidence associated with the lane marker 312 with a predetermined threshold as discussed above in relation to FIG. 3.

At step 606, computing device 115 determines the confidence level associated with a remaining first or second lane marker 208, 210, and, if the confidence level is medium or high, proceeds to step 608. If the confidence level is low, process 600 passes to step 612.

At step 608, computing device 115 determines a confidence value based on steerable path parameters including steerable path polynomial 418 and inertial navigation data acquired via sensors 116 that determine vehicle 110 speed and predicted lateral acceleration, for example. If steerable path parameter confidence is medium or high, an extension 422 is added to steerable path polynomial 418, and process 600 passes to step 610. If steerable path parameter confidence is low, process 600 passes to step 612.

At step 610, computing device 115 pilots vehicle 110 along steerable path polynomial 418 and extension 422. Following step 610 process 600 ends.

At step 612, computing device 115 alerts the occupant of vehicle 110 and turns control of piloting vehicle 110 over to the occupant. Following step 612 process 600 ends.

Figure 7:
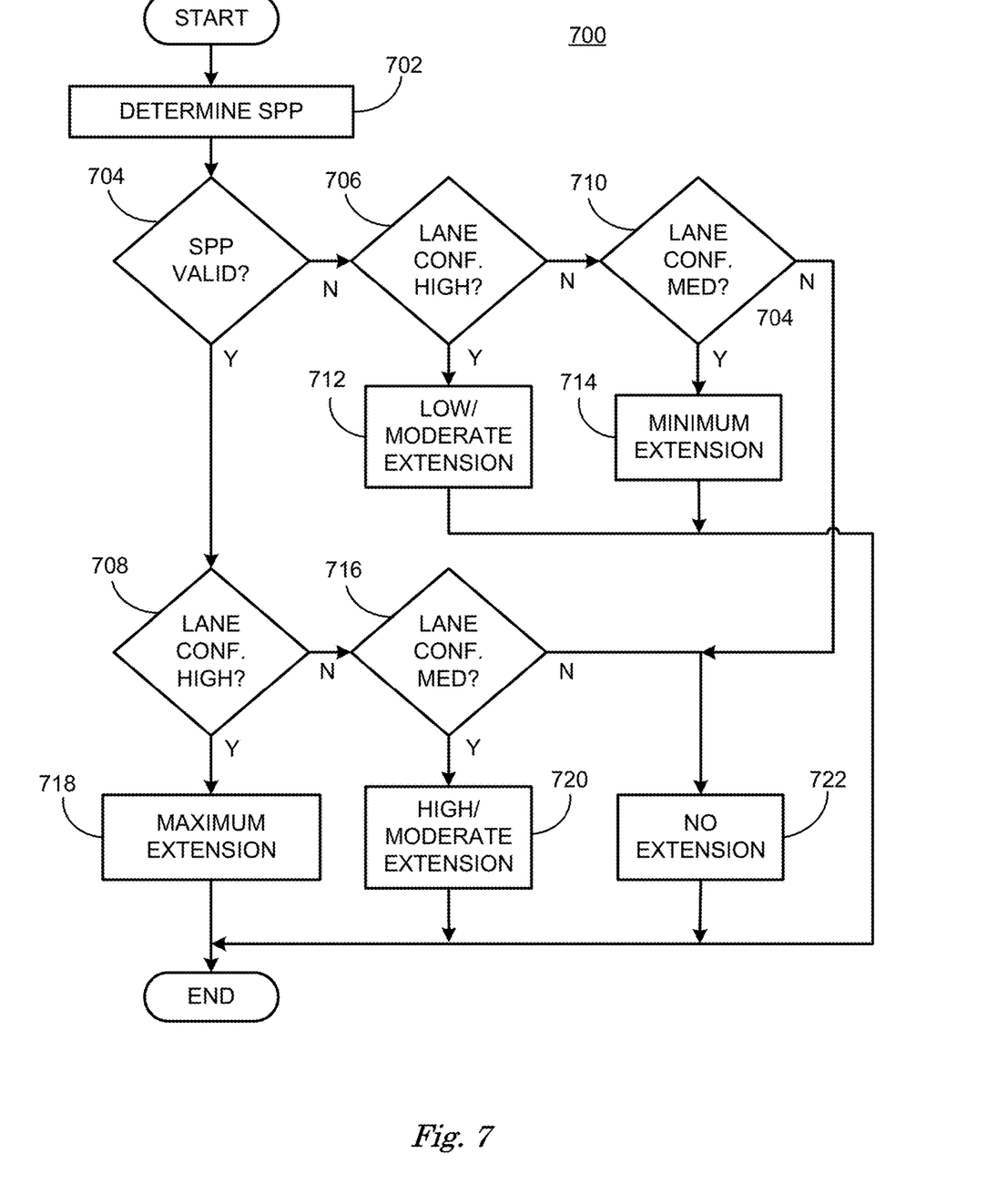
FIG. 7 is a flowchart diagram of an example process to determine time extensions for piloting a vehicle.

FIG. 7 is a diagram of a flowchart, described in relation to FIGS. 1-5, of a process 700 for determining a steerable path polynomial 418 extension 422 based on lane model confidence and steerable path parameter confidence. Process 700 can be implemented by a processor of computing device 115, taking as input information from sensors 116, and executing instructions and sending control signals via controllers 112, 113, 114, for example. Process 700 includes multiple steps taken in the disclosed order. Process 700 also includes implementations including fewer steps or can include the steps taken in different orders.

Process 700 begins at step 702, where computing device 115 determines steerable path parameters including a steerable path polynomial 518.

At step 704, computing device 115 determines whether the steerable path parameters are valid and if steerable path parameters include a steerable path polynomial 518 with adequate longitudinal range. Steerable path parameters are valid if computing device 115 can determine a steerable path polynomial 518 to direct the motion of vehicle 110 from a point p0 to a point p1 in a safe and accurate fashion. Piloting vehicle 110 from point p0 to point p1 in a safe and accurate fashion requires that steerable path polynomial 518 and vehicle trajectory remain within predetermined limits, determined by occupant comfort and traction limits, as discussed above in relation to FIG. 5.

Steerable path polynomial 518 has adequate longitudinal range if the distance from point p0 to point p1 is greater than a predetermined minimum value. For example, adequate longitudinal range can be defined by the reaction time required by an occupant to take control of a vehicle 110 upon being alerted by computing device 115 that occupant is required to control vehicle 110. This predetermined minimum value can be expressed in distance or time. For example, longitudinal range can be defined as the time in seconds it would take to travel the distance from point p0 to p1 at the current vehicle 110 speed. If the longitudinal range is greater than a predetermined minimum value, for example three seconds, longitudinal range is determined to be adequate and process 700 passes to step 708, otherwise, if steerable path polynomial 518 is not valid or does not have adequate longitudinal range, process 700 passes to step 706.

At step 706, computing device 115 determines if a remaining first or second lane marker 506, 508 has high confidence. If remaining first or second lane marker 506, 508 has high confidence, process 700 passes to step 712, otherwise process 700 passes to step 710.

At step 712, computing device 115 sets extension period of time to low/moderate. Following this step process 700 ends.

At step 710, computing device 115 determines if remaining first or second lane marker 506, 508 has medium confidence. If remaining first or second lane marker 506, 508 has medium confidence, process 700 passes to step 714, otherwise process 700 passes to step 722.

At step 714, computing device sets extension period of time to minimum extension. Following this step process 700 ends.

At step 708, computing device 115 determines if remaining first or second lane marker 506, 508 has high confidence. If remaining first or second lane marker 506, 508 has high confidence, process 700 passes to step 718 otherwise process 700 passes to step 716.

At step 716, computing device 115 determines if remaining first or second lane marker 506, 508 has medium confidence. If remaining first or second lane marker 506, 508 has medium confidence, process 700 passes to step 720 otherwise process 700 passes to step 722.

At step 718, computing device sets extension period of time to maximum extension. Following this step process 700 ends.

At step 720, computing device sets extension period of time to high/moderate extension. Following this step process 700 ends.

At step 722, computing device sets extension period of time to no extension. Following this step process 700 ends.

Figure 8:
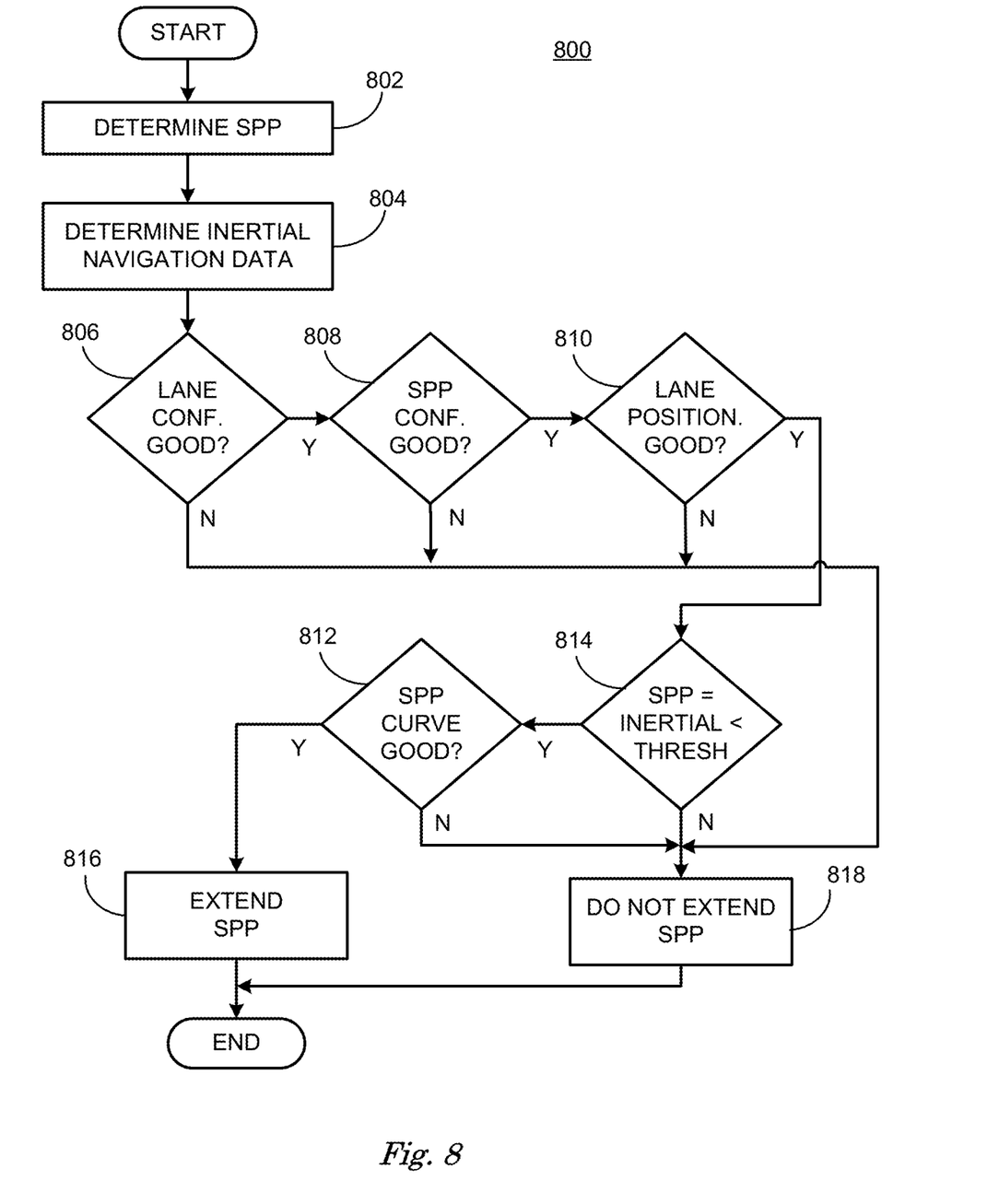
FIG. 8 is a flowchart diagram of an example process to determine time extensions for piloting a vehicle.

FIG. 8 is a diagram of a flowchart, described in relation to FIGS. 1-5, of a process 800 for determining whether to add an extension 522 to a steerable path polynomial 418 based on steerable path parameter confidence and inertial navigation data. Process 800 can be implemented by a processor of computing device 115, taking as input information from sensors 116, and executing instructions and sending control signals via controllers 112, 113, 114, for example. Process 800 includes multiple steps taken in the disclosed order. Process 800 also includes implementations including fewer steps or can include the steps taken in different orders.

Process 800 begins at step 802, where computing device 115 determines steerable path parameters including steerable path polynomial 518, for example. Steerable path polynomial 518 can have a non-zero radius of curvature r as discussed in relation to FIG. 5, above.

At step 804, computing device determines inertial navigation data from sensors 116 including the location, direction, speed, lateral acceleration and longitudinal acceleration of vehicle 110.

At step 804, computing device 115 can determine inertial navigation data with input from sensors 116 like accelerometers as discussed above in relation to FIGS. 3-5, above, and thereby determine a trajectory including the location, direction, speed, lateral acceleration and longitudinal acceleration of vehicle 110. Inertial navigation data can permit computing device 115 to predict lateral acceleration for vehicle 110 based on a current trajectory, and intended trajectory of vehicle 110 based on a steerable path polynomial 518.

At step 806, computing device 115 determines whether lane marker 510 confidence is good. As discussed above in relation to FIGS. 3-5, computing device 115 can determine lane marker 510 confidence by examining output from a machine vision program that determines lane marker 510 based on processing a visual representation of a lane marker 506, for example, to determine lane marker 510. A machine vision program can determine a probability that the lane marker 510 correctly represents the visual representation of a lane marker 506 and is associated with a lane model, and thereby output a confidence value that represents the probability that the lane marker 510 is a valid lane marker associated with a lane model that describes a roadway lane upon which a vehicle 110 is being piloted. In this example, lane marker 510 confidence equal to medium or high is determined to be good. If lane marker 510 confidence is determined to be not good, process 800 passes to step 818. If lane marker confidence is determined to be good, process 800 passes to step 808.

At step 808, computing device 115 can determine if steerable path parameter confidence is good. Steerable path parameter confidence can be determined by determining a probability that the steerable path parameters accurately represent a steerable path polynomial 214, 316, 418, 518 that a vehicle 110 is currently being piloted on. This probability can be determined by the machine vision technique that determines a steerable path polynomial 214, 316, 418, 518, and for example. If the steerable path parameter confidence is medium or low, process 800 can branch to step 818. If steerable path parameter is high, process 800 branches to step 810.

At step 810, computing device 115 can determine whether the position of vehicle 110, as determined by inertial navigation data, is on or within a predetermined distance, for example one-half of the width of vehicle 110, to the steerable path polynomial 518. If the position of vehicle 110 is not on or within the predetermined distance to steerable path polynomial 518, process 800 branches to step 818. If computing device 115 determines that the position of vehicle 110 is on or within the predetermined distance, steerable path polynomial 518, process 800 branches to step 814.

At step 814, computing device compares the steerable path polynomial 518 with the inertial navigation data to determine if the lateral acceleration predicted by the steerable path polynomial 518 is close to the value of lateral acceleration reported by the inertial navigation data. These values should be nearly equal. In examples where these values differ by more than a predetermined threshold, for example 20%, process 800 branches to step 818. In examples wherein these values differ by less than 20%, process 800 branches to step 812.

At step 812, computing device determines that a radius of curvature associated with a steerable path polynomial 518 currently being used to steer vehicle 110 is within predetermined limits, computing device 115 can determine that vehicle 110 can be safely piloted on the steerable path polynomial 518. The predetermined limits can be based on limits on lateral acceleration a generated by the radius of curvature r based on occupant comfort and traction limits as discussed above in relation to FIG. 5, which can determine the safety and accuracy with which computing device 115 can pilot vehicle 110. The lateral acceleration a and hence the radius of curvature r, based on the steerable path polynomial 518, can be limited to values that yield desired safety and accuracy. In examples wherein computing device 115 determines that the radius of curvature r is greater than predetermined limits, process 800 branches to step 818, otherwise process 800 branches to step 816.

At step 816, computing device 115 determines that steerable path polynomial 581 can have an extension 522 added. Process 700 can determine the amount of the extension 522, from minimum extension 522 through low/moderate and high/moderate extension 522 to maximum extension 522. Following this step, process 800 ends.

At step 818, computing device 115 determines that no extension 522 of steerable path polynomial will be made available to vehicle 110. Following this step, process 800 ends.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
controlling a vehicle according to a steerable path polynomial that extends for a distance D1 from a current point P0 of the vehicle on a roadway to a point P1 on the roadway, and that is determined based on determining first and second lane markers;
determining that one of the first or second lane markers has become a missing lane marker;
determining, based on the steerable path polynomial, vehicle acceleration data, and a steerable path polynomial confidence exceeding a threshold when the steerable path polynomial is extended for a distance D2, an extension to the steerable path polynomial for the distance D2 from the point P1 to a point P2 on the roadway, wherein the distance D2 extends past at least a part of the missing lane marker; and
controlling the vehicle based on the steerable path polynomial extension, wherein the steerable path polynomial confidence is based on a remaining first or second lane marker and a probability of accuracy of a lane model that includes the steerable path polynomial extension.

2. The method of claim 1, further comprising determining that the missing lane marker is missing because of a roadway entrance or exit ramp.

3. The method of claim 1, wherein determining the first and second lane markers includes processing one or more acquired images with Hough transforms to determine lane marker confidence.

4. The method of claim 3, further comprising determining the steerable path polynomial confidence based on the lane marker confidence, determining a position of the vehicle with respect to the steerable path polynomial, determining the steerable path polynomial curvature, and determining inertial navigation data.

5. The method of claim 4, further comprising determining the steerable path polynomial confidence based on determining the position of the vehicle with respect to the steerable path polynomial, determining the inertial navigation data, and determining the steerable path polynomial curvature.

6. The method of claim 5, wherein the position of the vehicle is determined based on the inertial navigation data.

7. The method of claim 6, wherein determining the steerable path polynomial curvature is based on the remaining first or second lane marker, the position of the vehicle and the inertial navigation data.

8. The method of claim 7, wherein the distance D2 is based on the steerable path polynomial curvature and the lane marker confidence.

9. The method of claim 8, further comprising determining the distance D2 based on the steerable path polynomial and vehicle speed or a predetermined time.

10. The method of claim 9, wherein the vehicle speed is based on the inertial navigation data.

11. A system, comprising a processor; and
a memory, the memory including instructions to be executed by the processor to:
control a vehicle according to a steerable path polynomial that extends for a distance D1 from a current point P0 of the vehicle on a roadway to a point P1 on the roadway, and that is determined based on determining first and second lane markers;
determine that one of the first or second lane markers has become a missing lane marker;
determine, based on the steerable path polynomial, vehicle acceleration data, and a steerable path polynomial confidence exceeding a threshold when the path polynomial is extended for a distance D2, an extension to the steerable path polynomial for the distance D2 from the point P1 to a point P2 on the roadway, wherein the distance D2 extends past at least a part of the missing lane marker; and
control the vehicle based on the path polynomial extension, wherein the steerable path polynomial confidence is based on a remaining first or second lane marker and a probability of accuracy of a lane model that includes the steerable path polynomial extension.

12. The system of claim 11, further programmed to determine the missing lane marker is missing because of a roadway entrance or exit ramp.

13. The system of claim 11, further programmed to determine the first or second lane markers by processing one or more acquired images with Hough transforms to determine lane marker confidence.

14. The system of claim 13, further programmed to determine the steerable path polynomial confidence based on the lane marker confidence, determining a position of the vehicle with respect to the steerable path polynomial, determining the steerable path polynomial curvature, and determining inertial navigation data.

15. The system of claim 14, further programmed to determine the steerable path polynomial confidence based on determining the position of the vehicle with respect to the steerable path polynomial, determining the inertial navigation data, and determining the steerable path polynomial curvature.

16. The system of claim 15, further programmed to determine the position of the vehicle based on the inertial navigation data.

17. The system of claim 16, further programmed to determine the steerable path polynomial curvature is based on the remaining first or second lane marker, the position of the vehicle and the inertial navigation data.

18. The system of claim 17, further programmed to determine the distance D2 is based on the steerable path polynomial curvature and the lane marker confidence.

19. The system of claim 18, further programmed to determine the distance D2 based on the steerable path polynomial and vehicle speed or a predetermined time.

20. The system of claim 19, further programmed to determine the vehicle speed based on the inertial navigation data.

* * * * *